No. 678,817. Patented July 16, 1901.
W. W. TYLER.
TURBINE WATER WHEEL.
(Application filed Aug. 17, 1900.)
(No Model.) 3 Sheets—Sheet 1.
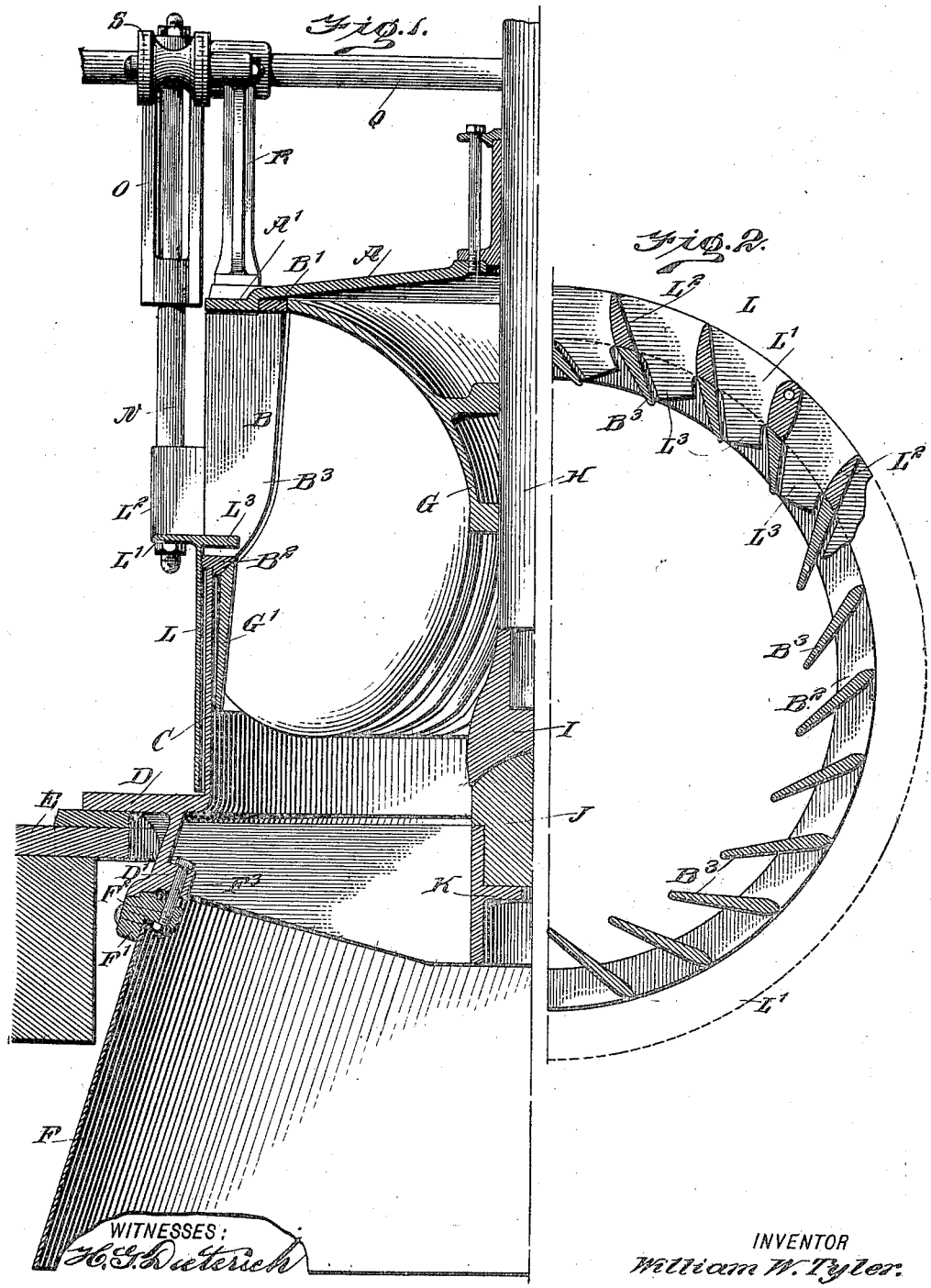
WITNESSES:
INVENTOR
William W. Tyler.
BY
ATTORNEYS No. 678,817. Patented July 16, 1901.
W. W. TYLER.
TURBINE WATER WHEEL.
(Application filed Aug. 17, 1900.)
(No Model.) 3 Sheets—Sheet 2.

WITNESSES:
INVENTOR
William W. Tyler.
BY
ATTORNEYS

No. 678,817. Patented July 16, 1901.
W. W. TYLER.
TURBINE WATER WHEEL.
(Application filed Aug. 17, 1900.)
(No Model.) 3 Sheets—Sheet 3.

WITNESSES:
H. G. Dieterich
Rev. G. Hoskins

INVENTOR
William W. Tyler.
BY
ATTORNEYS

UNITED STATES PATENT OFFICE.

WILLIAM W. TYLER, OF DAYTON, OHIO.

TURBINE WATER-WHEEL.

SPECIFICATION forming part of Letters Patent No. 678,817, dated July 16, 1901.

Application filed August 17, 1900. Serial No. 27,174. (No model.)

*To all whom it may concern:*

Be it known that I, WILLIAM W. TYLER, a citizen of the United States, and a resident of Dayton, in the county of Montgomery and State of Ohio, have invented certain new and useful Improvements in Turbine Water-Wheels, of which the following is a full, clear, and exact description.

The object of the invention is to provide certain new and useful improvements in turbine water-wheels whereby the cylinder-gate is completely balanced and the pressure of the water neither tends to open or close the gate at any point of its position and whereby the course of the water through the chutes is always smooth and the water is not obstructed by the sharp edges of the gate projecting in the watercourse, so that the full power of the water-head is utilized to the greatest advantage to increase the efficiency of the wheel.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 3:
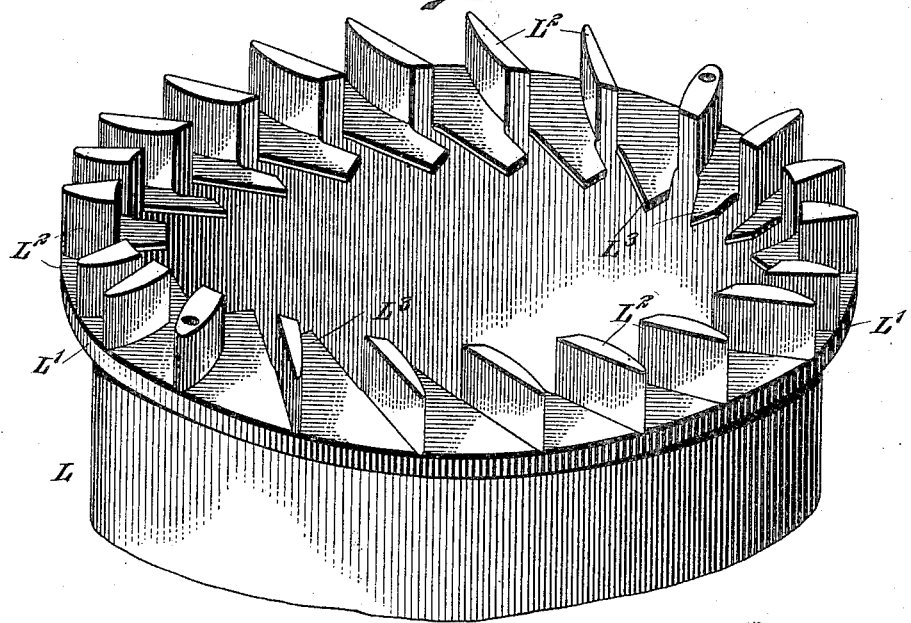
Figure 4:
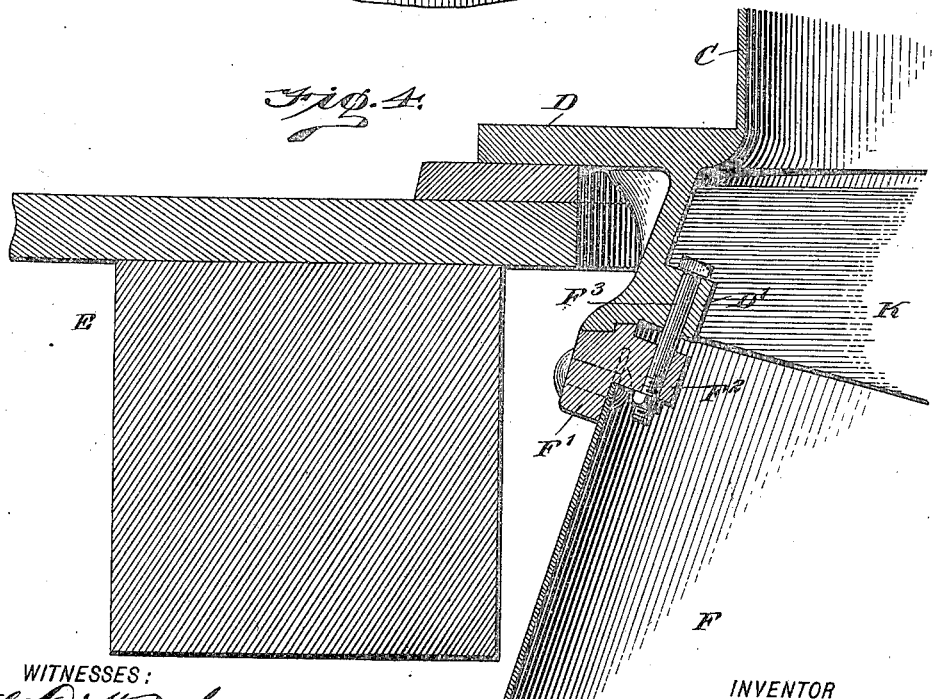
Figure 5:
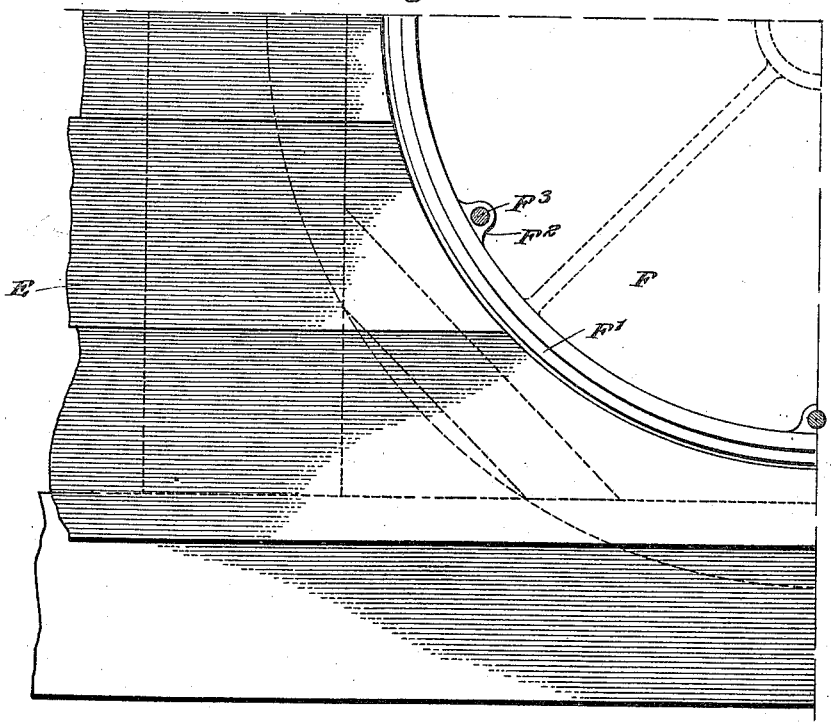
Figure 6:
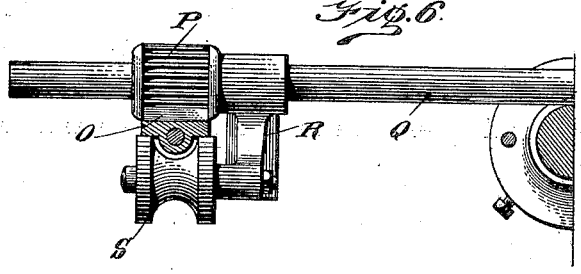
Figure 7:
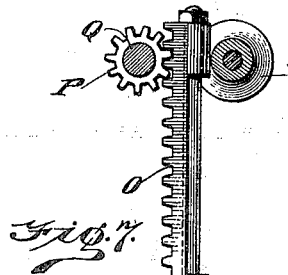
Figure 8:
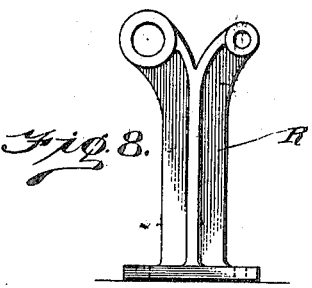

Figure 1 is a sectional side elevation showing one-half of a turbine water-wheel provided with the improvement. Fig. 2 is a sectional plan view of part of the gate and chute frame. Fig. 3 is a perspective view of the cylinder-gate. Fig. 4 is an enlarged sectional side elevation of the base-ring, the timber-support, and part of the center draft-tube and part of the flaring lower draft-tube. Fig. 5 is a plan view of the timber-support for the base-ring and the lower draft-tube. Fig. 6 is a plan view of the actuating mechanism for the gate, parts being shown in section. Fig. 7 is a cross-section of the same, and Fig. 8 is a face view of the stand for the gate-actuating mechanism.

The turbine-wheel casing consists, essentially, of a cover or top A, extending over a chute-frame B, carried by a central draft-tube C, integral on a base-ring D, resting on a suitable timber-support E, as is plainly shown in Figs. 1, 4, and 5, said base-ring supporting a flaring lower draft-tube F. The water-wheel or runner G is secured on a shaft H, stepped in a rotary shoe I, held on a step-block J, set in a spider K, integral with the base-ring D, as indicated in Figs. 1 and 4. The chute-frame B consists, essentially, of an upper ring B', a bottom ring $B^2$, and connecting-bars $B^3$, connecting the rings with each other and forming the main chutes for directing the water against the buckets of the water-wheel or runner G. A cylinder-gate L is arranged exteriorly of the chute-frame B and the central draft-tube C, and on the upper end of this cylinder-gate L is formed an outwardly-extending flange L', supporting on its top bars $L^2$ for forming auxiliary chutes for the chutes of the chute-frame B, as plainly indicated in Fig. 2. The bars $L^2$ of the auxiliary chutes on the gate L form outer extensions of the stationary bars $B^3$ of the chute-frame B, the said bars $L^2$ extending in alinement with the bars $B^3$, as is plainly shown in Fig. 2.

On the annular flange L' of the gate L extend inwardly wings $L^3$ of a length about equal to the width of the ring $B^2$ and reaching between adjacent bars $B^3$ of the chute-frame B, so that annular flange L' and wings $L^3$ form the bottom of the waterway leading to the wheel or runner G, no matter whether the gate is raised or lowered or is in an intermediate position.

By reference to Fig. 1 it will be seen that the cylinder-gate L fits snugly against the outside of the lower or bottom ring $B^2$ of the chute-frame B, and the outer edge of said ring $B^2$ is in alinement with the outer edges of the bars $B^3$, while the upper ring B' engages the bars $B^3$ only at the inner ends, and the front portion of the bars is engaged by an annular offset A', formed on the top or cover A. This is necessary to permit of placing the gate L in position on the water-wheel casing at the time the cover A is removed, it being understood that the construction described is necessary, so that the wings $L^3$ can pass between the bars $B^3$ when placing the gate in position. The offset A' of the cover forms the top of the waterway and the seat against which the gate closes.

The inner edge of the lower ring $B^2$ is beveled and engaged by the corresponding beveled upper end of a band G', surrounding and secured to the lower ends of the buckets of the water-wheel or runner G. By this construction the space between the wheel or runner and the draft-tube and which is below the wings $L^3$ will be closed, forming a chamber below the said wings, through which there is no appreciable current of water. Two diametrically opposite bars $L^2$ for forming the auxiliary chutes are engaged by rods N, supporting racks O in mesh with pinions P, secured on a shaft Q, mounted to turn in suitable bearings on stands R, bolted or otherwise fastened to the offset A' of the cover or top A, as indicated in Fig. 1.

On each stand R is journaled an antifriction-roller S, engaging the top of the rack O, so as to hold the latter at all times in mesh with its pinion P to insure proper and accurate raising and lowering of the gate L when the shaft Q is turned in the corresponding position. The rods N form vertical extensions of the bars $L^2$, on which they are secured.

By having the annular flange L' extending outward from the cylinder-gate L and the wings $L^3$ extending inward and there being no passage for a current of water below the wings between the wheel or runner and the draft-tube it is evident that the pressure on the tops of the flange L' and wings $L^3$ is equal to the pressure exerted on the under side of the said flange L' and the wings $L^3$, so that the gate is balanced at any position it may be in. The pressure of the water on the top of the flange L' at the entrance to the chutes is that of the head operating on the wheel and is substantially the same as the pressure on the under side of the said flange L', and the pressure of the water on the tops of the wings $L^3$ at the discharge of the water from the chutes is that of the head operating on the wheel minus the head due to the velocity with which the water flows at that point, and this same pressure is exerted against the under side of the gate-wings $L^3$. The pressure upon intermediate points upon the upper surfaces of flanges L' and $L^3$ will vary regularly from the maximum at the entrance to the chutes to the minimum at the discharge from the chutes, the pressure at each point being that of the head operating on the wheel minus the velocity-head at that point, the velocity regularly increasing from the entrance to the discharge. Thus the average pressure upon the upper surfaces of the flanges will be a mean between the two extremes. The pressure upon the lower surface of flange L' (and upon the bottom of gate-body L) being that of the head operating upon the wheel and that upon the lower surface of flanges $L^3$ being that of the water at the discharge from the chutes, the average upward pressure upon the lower surfaces will be a mean between these two extremes. The flanges can be made of such relative widths that the average pressure below shall be equal to the average pressure above, and thus the gate will be counterbalanced as to fluid-pressure at any of its positions. It is understood that the pressure varies at different positions of the gate, and by my arrangement above described provision has been made to balance the gate at every position it is in.

By reference to Fig. 2 it will be seen that the inner edges of the connecting-bars $B^3$ of the chute-frame are curved inwardly and upwardly from the inner edge of the lower ring $B^2$ and then incline upwardly and inwardly in a straight line to the inner edge of the upper ring B', and the runner G is correspondingly shaped to give the runner a bell-shape appearance. By this arrangement a proper length of the chutes is obtained at the upper portion of the gate-frame by the widened connecting-bars $B^3$; but in the lower portion of the chute-frame the proper length of the chutes is only obtained by the auxiliary chutes.

By the construction described the cylinder-gate L is always balanced, and the pressure of the water does not tend to either open or close the gate, no matter in what position the gate may be. By constructing the watercourse in the manner described part of the velocity with which the water enters the wheel is obtained in the gate and part in the stationary chutes. All the head or pressure of the water which imparts velocity in the gate tends to close the gate, while all that creates velocity in the stationary chutes tends to open the gate. The construction of the gate, as described, is such that the two pressures are equal and balance each other, and consequently the gate is balanced.

In order to bring the timber-support E as close to the wheel as possible, the lower flaring draft-tube F is riveted at its upper end to a ring F', formed with inwardly-extending lugs $F^2$, engaged by bolts $F^3$, held in lugs D', projecting inwardly from the lower flange of the base-ring D. (See Figs. 1 and 4.) By having the lugs $F^2$ D' extending inwardly it is evident that the timber-support E can be moved close to the outer wall of the lower flange of the base-ring D, so that a very firm support is given to the turbine water-wheel.

Having thus fully described my invention, I claim as new and desire to secure by Letters Patent—

1. A turbine water-wheel having stationary chutes, and a cylinder-gate provided with chutes auxiliary to the said stationary chutes, as set forth.

2. A turbine water-wheel having stationary chutes, a cylinder-gate, and chutes integral with the cylinder-gate and auxiliary to the said stationary chutes, as set forth.

3. A turbine water-wheel having stationary chutes, a cylinder-gate movable exteriorly over the said stationary chutes to close or open the same, an outwardly-extending flange on the upper end of the said cylinder-gate, and chutes on top of the said flange and auxiliary to the said stationary chutes, as set forth.

4. A turbine water-wheel having stationary chutes, a cylinder-gate movable exteriorly over the said stationary chutes to close or open the same, an outwardly-extending flange on the upper end of the said cylinder-gate, chutes on top of the said flange and auxiliary to the said stationary chutes, and wings extending inwardly from the upper end of the said cylinder-gate and in horizontal alinement therewith the said wings extending between the walls of the stationary chutes, as set forth.

5. In a turbine water-wheel, a casing, a revoluble wheel, and a cylindrical gate having at its upper end an annular outwardly-extending flange and inwardly-extending wings in horizontal alinement with the flange, the wheel contacting with the casing below the wings of the gate and forming a chamber below said wings, substantially as described.

6. In a turbine water-wheel, a chute-frame provided with stationary chutes, a revoluble wheel, a cylindrical gate exterior of the chute-frame and having at its upper end an outwardly-extending annular flange, and spaced wings extending inwardly in horizontal alinement with the flange and between the stationary chutes, the wheel contacting with the chute-frame below the wings of the gate and forming a chamber below said wings, substantially as described.

7. In a turbine water-wheel, a chute-frame having stationary chutes, a revoluble wheel, and a cylindrical gate exterior of the chute-frame and provided at its upper end with an outwardly-extending annular flange, having on its upper face chutes in alinement with the stationary chutes, and with spaced wings extending inwardly in horizontal alinement with the flange and between the stationary chutes, the wheel engaging the chute-frame below the wings of the gate forming a chamber therebelow, substantially as described.

8. A turbine water-wheel having a chute-frame with stationary chutes, and a cylinder-gate movable on the outside of the said chute-frame and having auxiliary chutes forming outward extensions of said stationary chutes, as set forth.

9. A turbine water-wheel having a chute-frame with stationary chutes, and a cylinder-gate movable on the outside of the said chute-frame and having auxiliary chutes forming outward extensions of said stationary chutes, and arranged in alinement therewith, as set forth.

10. A turbine water-wheel, comprising a bell-shaped runner, a stationary chute-frame having connecting-bars gradually increasing in width from the bottom to the top, and a movable cylinder-gate provided with auxiliary chutes having chute-bars forming extensions of the said connecting-bars, as set forth.

In testimony whereof I have signed my name to this specification in the presence of two subscribing witnesses.

WILLIAM W. TYLER.

Witnesses:
 HENRY A. BREWSTER,
 EDWARD A. JONES.